March 11, 1969

H. E. KIERNAN 3,431,995

VEHICLE AND DRIVER SAFETY DEVICE

Filed Jan. 19, 1966

INVENTOR.
HENRY E. KIERNAN

BY

Kane, Dalsimer, Kane + Smith

ATTORNEYS under United States Patent Office 3,431,995
Patented Mar. 11, 1969

3,431,995
VEHICLE AND DRIVER SAFETY DEVICE
Henry E. Kiernan, 136 W. Pulaski Road,
Huntington Station, N.Y. 11746
Filed Jan. 19, 1966, Ser. No. 521,595
U.S. Cl. 180—82                    6 Claims
Int. Cl. B60k 27/00, 33/00; B60r 19/00, 23/00

ABSTRACT OF THE DISCLOSURE

A driver safety device including a safety belt coupled to the steering mechanism of a vehicle. The safety belt is also intimately coupled to at least one control mechanism of the vehicle, such as the brake or transmission, in such a manner that the control mechanism cannot be made operative unless the belt is placed firmly about the vehicle driver.

---

The present invention relates to a vehicle and driver safety device and, more particularly, to a saftey belt assembly intimately related with at least one control mechanism of the vehicle in such a manner that, unless the belt is firmly placed about the driver or, conversely, deliberately released, the control mechanism will remain in an inoperative condition until such time as the belt is properly applied.

In a number of instances, an employer will require its drivers to use safety belts while driving company vehicles either as a matter of policy, to minimize the risk of personal injury or for one of any number of reasons. The human factor being what it is, a number of drivers will either intentionally or inadvertently fail to apply a seat belt when the opportunity to do so exists. On short hauls or trips, as is frequently the case in delivering packages, parcels, mail, bakery and milk products, etc., the driver may consider a seat belt an annoyance or inconvenience to such an extent that it would outweigh his concern over personal safety. In situations of this type, delivery duties may predominate the driver's thoughts whereby the vehicle's parking brakes may not be applied when the vehicle is left unattended, possibly with the engine running. Vehicle run-away is not an uncommon occurrence resulting in serious personal and property injury and damage.

With the foregoing in mind, it is a principal object of this invention to provide a safety belt mechanism for vehicles which, when operated by the driver to apply the safety belt and position it properly about his waist, the vehicle is in a condition to be driven; but in the event the safety belt is not in proper position either by design on the part of the driver or through his inadvertence, essential control mechanisms of the vehicle are placed in an inoperative condition thereby rendering it difficult, if not impossible, for the vehicle to move accidently or by design.

Another object is to provide a safety mechanism of the above type which is coupled with the vehicle's braking mechanism in such a manner that when the driver releases the safety belt, the braking mechanism will automatically be applied or, on the other hand, have a transmission mechanism such as the driving transmission placed in neutral when the safety belt has not been properly applied or perhaps in gear for braking purposes.

In accordance with an exemplary and somewhat preferred embodiment of the invention, a safety belt is conveniently mounted on the steering mechanism of a vehicle. The steering mechanism is so designed as to be shifted towards the driver's seat to a point at which the safety belt contacts the driver's waist and, at the same time, releases the brake mechanism on the vehicle. When the vehicle is stopped for one reason or another, the driver need only push the steering mechanism away from the driver's seat which will result in release of the safety belt and simultaneous actuation of the braking mechanism. In this manner, the drivers will be prevented from neglecting to fasten their safety belts. As explained in the foregoing, the shifting of the steering mechanism may be coupled with the vehicle's transmission system such that instead of applying the brakes when the seat belt has not been properly applied, the transmission will be shifted to a neutral position or gear to prevent runaway.

Other objects and advantages will become apparent from the following detailed description which is to be taken in conjunction with the accompanying drawing illustrating several somewhat preferred embodiments of the invention and in which.

Figure 1:
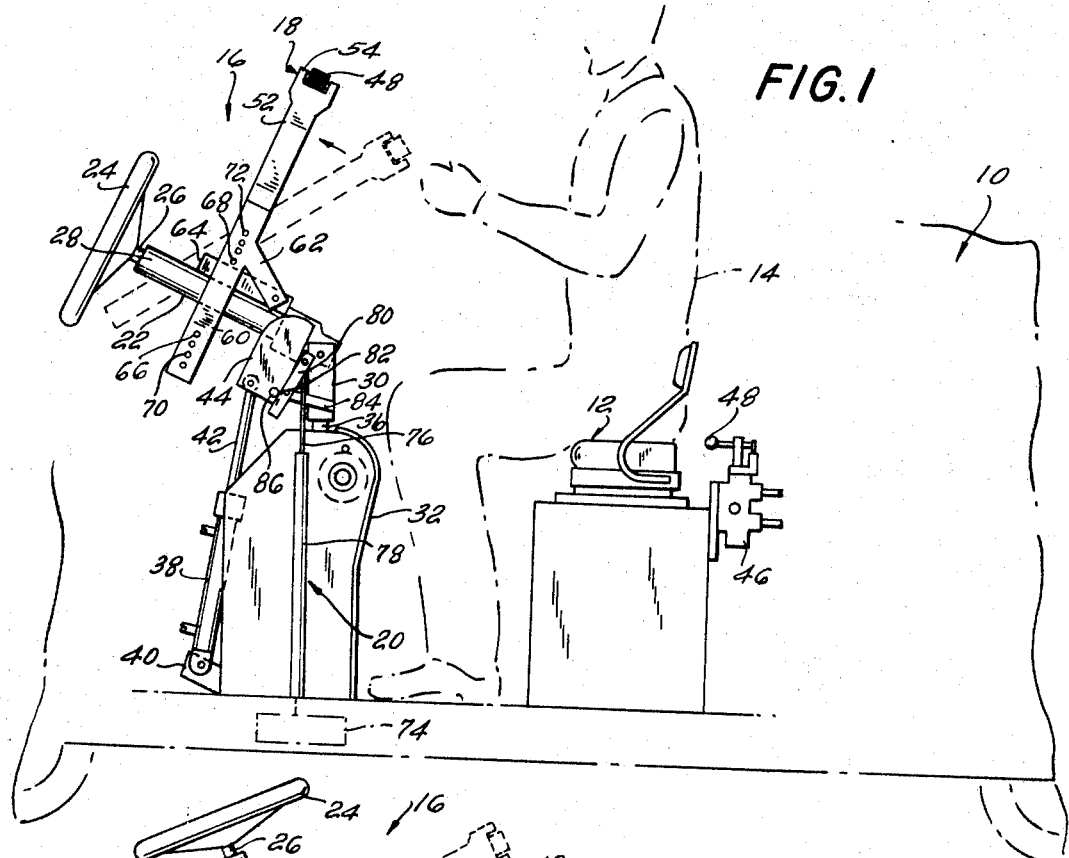
FIG. 1 is a side elevational view showing the driver's seat and steering mechanism of a vehicle the outline of which is shown in phantom as is the case with the driver with the safety belt released and the vehicle's braking mechanism actuated.
Figure 2:
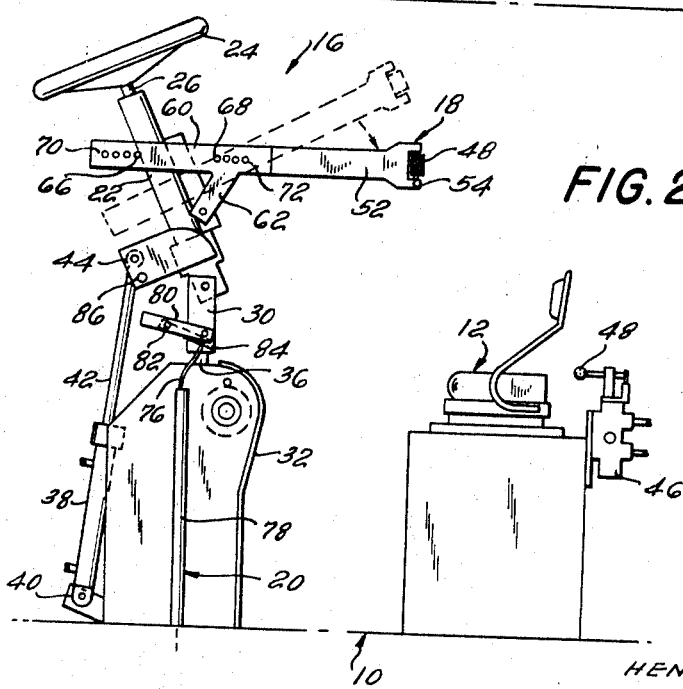
FIG. 2 is a similar elevational view showing the shifting of the steering mechanism towards its normal operating position and the corresponding movement of the safety belt.

In the drawings, a vehicle 10 is illustrated and is typical of the type of equipment contemplated by the present invention which would require or perhaps suggest that the driver or operator be propely seated with a safety belt applied. Accordingly, a driving seat 12 is shown on which the driver 14 sits during operation of the vehicle. In the case of the usual type vehicle, a driving mechanism 16 is operated by the driver. According to the present invention, a seat belt assembly 18 is coupled with the steering mechanism in a fashion to be released when operating parts of the driving mechanism 16 are shifted away from the driver and applied to the waist of the driver when these parts are returned to their proper operating position. In order to assure against operation of the vehicle 10 when the safety belt assembly is not in proper position for one reason or another, a safety device 20 is interposed between the steering mechanism 16 and either the vehicle's transmission or, as depicted in the exemplary embodiment, the vehicle's braking mechanism such that the vehicle 10 will only be permitted to resume normal operation when the safety belt assembly 18 is properly positioned about the driver 14.

Referring to the steering mechanism 16, it will be understood that shiftable steering column 22 is present, the position of which determines the location of the safety belt assembly 18 and the operation of the vehicle 10. In this connection, a steering wheel 24 is keyed to a rotatable shaft 26 suitable journaled in a tube 28. This tube 28 is pivotally mounted by means of a bracket 30 projecting upwardly from the standard 32 supported by the vehicle chassis. Under these circumstances, the wheel 24 is adapted to traverse an arc between the fully inoperative position of the steering mechanism 16 depicted in FIG. 1 to the operative position of FIG. 3. In order to accommodate this pivotal movement, the shaft 26 is interrupted by means of an aligned pivotal connection 34 with the lower section 36 of the shaft extending to the remainder of the particular steering mechanism. The steering mechanism may assume one of a number of different forms either or the manual or power type and also may include a flexible shaft or a multiple universal where needed.

The desired extent of pivotal movement of the upper section of the steering mechanism 16 may be accomplished in any one of a number of different ways either by means of a suitable manual actuated system or mechanical linkage or a power actuated mechanism, examples of which may be electrically or pneumatically powered or the hydraulic system illustrated in the drawings. This system includes a hydraulic piston-cylinder unit 38 the base end of which is pivotal on a bracket 40 connected either with the standard 32 or the vehicle chassis. The piston rod 42 is reciprocal in a substantially vertical direction with its upper end pivotally connected to an arm 44 fixedly connected with the tube 28. The forward as well as the rear face of the piston within the cylinder of the unit 38 is hydraulically connected with a four-way flow control valve 46 the setting of which is adapted to be controlled by means of the handle 48. This valve 46 may assume the form of any one of a number of commercially available manually operated hydraulic four-way valves. As will be observed in the drawings, this valve 46 is conveniently located adjacent the seat 12 so that the driver 14 may readily grasp the handle 48 for purposes of either reciprocating the piston rod 42 outwardly relative to the cylinder or retracted therein. Accordingly, with this arrangement, the forwardmost position of the steering mechanism 16 may be controlled as well as its rearmost position at which the vehicle 10 is in condition to be properly operated.

Although in the disclosed embodiment, the extreme positions of the steering mechanism 16 are determined by the displacement of the piston and its rod 42, suitable stops may be incorporated. Similarly, the piston-cylinder unit 38 as disclosed is of the double-acting variety, but a single acting unit can be employed in which case the valve 46 need only have three-way flow control. In addition, this invention contemplates substituting, where appropriate, a simple return spring for the unit 38 which would be manually or mechanically tensioned when shifting the steering mechanism to the operative condition of FIG. 3 at which location a releasable latch would serve to maintain this position until deliberately released.

As explained in the above, the disposition of the safety belt assembly is determined by the position of the steering mechanism 16. With this in mind, the safety belt assembly 18 includes a safety belt 48 of suitable material and which may also be of the adjustable and removable type. The ends of the belt 48 are connected across the open free ends of the U-shaped member in the manner shown. This U-shaped member includes a pair of spaced arms 50 and 52 the free ends of which present pins 54 about which the ends of the safety belt 48 extends. The other ends of the arms 50 and 52 are suitably bent into the respective bases 55 and 56 which extend in a converging direction and then extend into another pair of transverse arms 58 and 60, respectively. These arms 58 and 60 embrace the tube 28 but are permitted relative movement relative thereto. In this connection, each of the arms 58 and 60 include a downwardly depending plate 62 the lower end of which is pivotally mounted by bracket 64 extending rearwardly from the tube 28. Where desirable and as is the case in the embodiment illustrated in the drawings, some play is permitted between the arms 58 and 60 and consequently, the safety belt assembly 18 relative to the steering column and, more particularly, the tube 28 and projecting bracket 64. This play not only serves to permit adjustment of the location of the belt 48 relative to the waist of the driver 14 but permits slight rearward movement of the safety belt assembly 18 as the steering mechanism 16 is shifted to its operative position to thereby reduce the forces of engagement and impact as the belt 48 engages the waist of the driver 14. This play is determined by the location of pins 66 and 68 and the associated accommodating holes 70 and 72, respectively.

Figure 3:
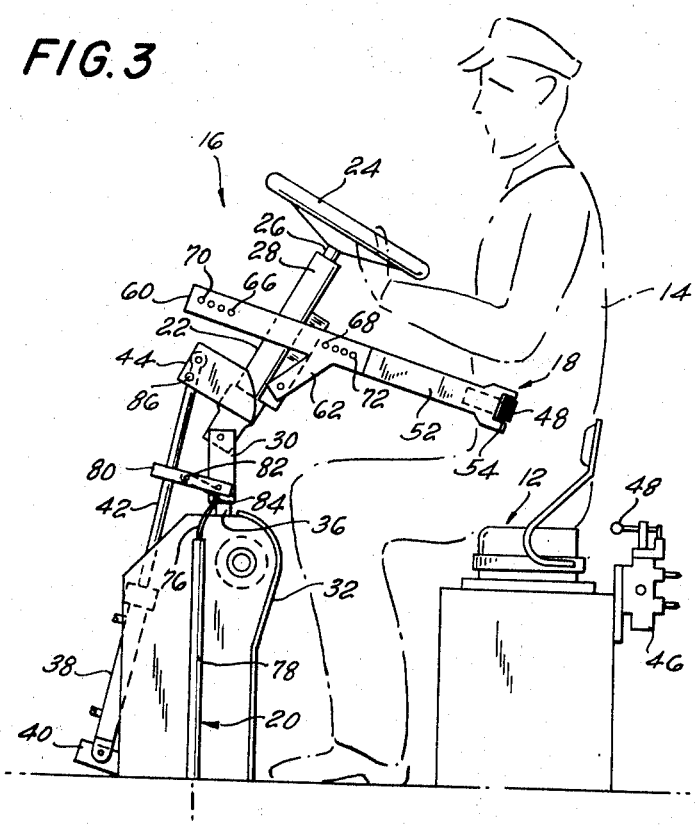
FIG. 3 is another similar view showing the proper application of the safety belt following the shifting of the steering mechanism to its completely operative position at which the vehicle's braking mechanism is simultaneously released.
Figure 6:
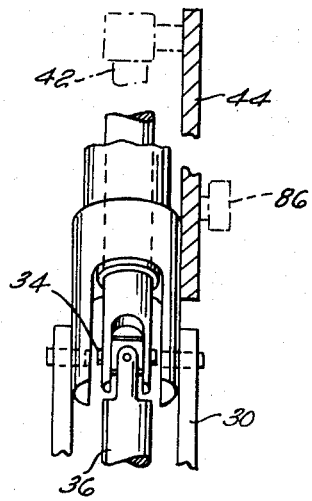
FIG. 6 is an enlarged fragmentary elevational view of column which permits shifting of the steering wheel and corresponding movement of the braking mechanism.
Figure 4:
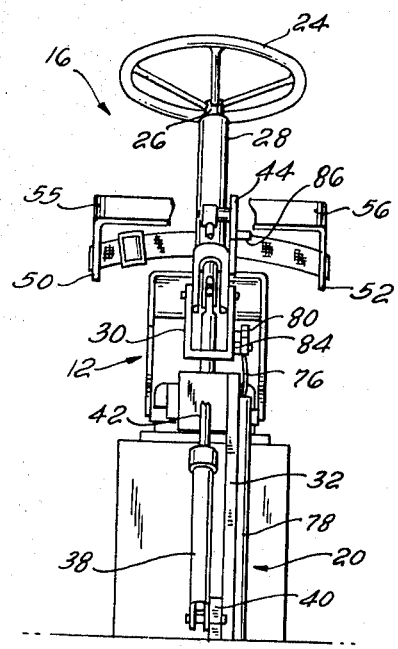
FIG. 4 is a front end elevational view of the disposition of parts of FIG. 3.
Figure 5:
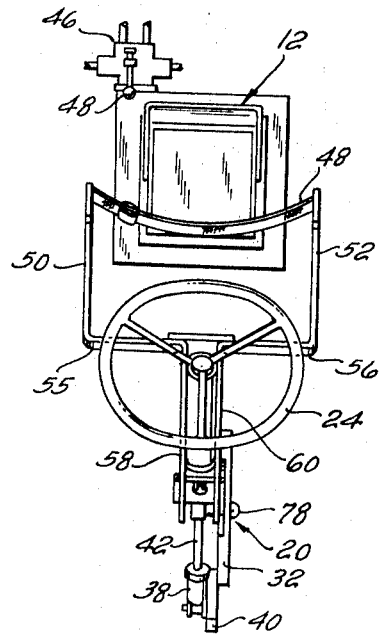
FIG. 5 is a top plan view thereof; and the pivotal connection between the parts of the steering

The described movement of the steering mechanism 16 is intended to actuate means for assuring the safety of the driver and the vehicle as well. Towards this end, an interlocking means 20 interconnects the steering mechanism 16 with the vehicle's braking system 74 or the transmission system thereof. With respect to the latter, the rearward operating position of the steering mechanism 16 will automatically place the transmission in neutral or in gear to assure against the possibility of the vehicle accidently running away while unattended. With respect to the interconnected braking device 74, a flexible cable 76, for example, may extend through an upright tube 78 supported by the vehicle chassis and, when pulled, this cable may operate to apply the brake and when shifted to a retracted position, may serve to release the brake. Accordingly, the free end of the cable 76 is connected with one end of a pivotal plate 80 pivotal about a substantially stationary pivot pin 82 extending from a plate 84 fixed to the bracket 30. The other end of the pivotal plate 80 is adapted to be engaged by a pin 86 projecting from the plate 44 and particularly when the steering mechanism is released from its operating position as depicted by FIG. 3. In this manner, the brake is automatically applied when the steering mechanism 16 is shifted towards its inoperative position. When the driver wishes to resume operation, he need only shift the steering mechanism 16 rearwardly to the operative position at which the seat belt 48 is properly applied and the braking mechanism 74 automatically released. Naturally, the interlocking mechanism 20 and particularly the operator for releasing and applying the brake may assume the form of a microswitch, limit switch, pressure switch, proximity switch, solenoid or suitable mechanical linkage or the like.

Thus, a force reminder in effect is provided by the present invention serving as a safety to assure the protection of the driver as well as the vehicle. With respect to the latter, vehicle run-away while the engine is running is effectively prevented. In this regard, the shifting of the steering mechanism 16 and release of the safety belt assembly 18 will either automatically apply the parking brakes or automatically place the transmission in neutral or gear, as the case may be, or, on the other hand, only be possible when the driver himself applies the parking brake or places the transmission in the selected position.

Although several somewhat preferred embodiments of this invention have been disclosed and described in detail herein, it should be understood that this invention is in no sense limited thereby and its scope is to be determined by that of the appended claims.

I claim:

1. A vehicle having a steering mechanism and a driver safety means coupled therewith, said steering mechanism including a driver operated part and shifting means for shifting the driver operated part between a first operative position coveniently disposed with respect to the driver of said vehicle and at which the driver is adapted to operate the steering mechanism and a second position away from and relatively inaccessible to the driver, said driver safety means including a safety belt and a frame for coupling the belt with the driver operated part of said steering mechanism in such a manner that the belt is applied about the drive when the driver operated part of the steering mechanism is in the first position and the belt is released from about the driver when the driver operated part of the steering mechanism is shifted towards the second position.

2. The invention in accordance with claim 1 wherein power means operable by the driver are coupled with the steering mechanism to automatically shift the driver operated part between the first and second positions.

3. The invention in accordance with claim 1 wherein said safety means further includes means for reducing impact of the belt upon the driver as the driver operated part of the steering mechanism is shifted from the second to first positions.

4. The invention in accordance with claim 1 wherein the safety means further includes means for adjusting the relative disposition of the frame relative to the steering mechanism to adjust the belt relative to the driver.

5. The invention in accordance with claim 1 wherein the vehicle includes an operating part on which movement of the vehicle depends, a vehicle safety means is incorporated in said vehicle and includes an interlock between the steering mechanism and the operating part of the vehicle such that when the driver operated part is at said first position the vehicle is adapted to move and when the driver operated part is shifted out of the first position to said second position vehicle movement is prevented.

6. The invention in accordance with claim 5 wherein the operating part is a brake and said interlock includes linkage means such that when the driver operated part is at said first position the brake is released and when the driver operated part is shifted out of the first position the brake is applied.

References Cited

UNITED STATES PATENTS

| | | | |
|---|---|---|---|
| 1,841,294 | 1/1932 | Nicholson | 280—87 |
| 3,078,945 | 2/1963 | Frey | 180—78 |
| 3,185,246 | 5/1965 | Maurer | 280—150 |
| 3,199,625 | 10/1965 | Liebreich | 180—77 |
| 3,279,817 | 10/1966 | Henry | 280—150 |

FOREIGN PATENTS

| | | |
|---|---|---|
| 1,117,049 | 2/1956 | France. |
| 945,895 | 1/1964 | Great Britain. |

KENNETH H. BETTS, *Primary Examiner.*

U.S. Cl. X.R.

280—150